(12) United States Patent
Huang (10) Patent No.: US 12,287,082 B1
(45) Date of Patent: Apr. 29, 2025

(54) HEATED ILLUMINATED BATHROOM MIRROR WITH SENSING MODULES

(71) Applicant: Rosemead Home & Garden, Inc., Ontario, CA (US)

(72) Inventor: Leshi Huang, Guangdong (CN)

(73) Assignee: Rosemead Home & Garden, Inc.

( * ) Notice: Subject to any disclaimer, the term of this patent is extended or adjusted under 35 U.S.C. 154(b) by 0 days.

(21) Appl. No.: 18/399,644

(22) Filed: Dec. 28, 2023

(51) Int. Cl.
| | |
|---|---|
| A45D 42/10 | (2006.01) |
| F21V 23/04 | (2006.01) |
| F21V 33/00 | (2006.01) |
| G02B 27/00 | (2006.01) |
| F21Y 115/10 | (2016.01) |

(52) U.S. Cl.
CPC ........ *F21V 33/004* (2013.01); *F21V 23/0471* (2013.01); *G02B 27/0006* (2013.01); *F21Y 2115/10* (2016.08)

(58) Field of Classification Search
CPC .......... A45D 42/10; A45D 42/08; A47G 1/00; F21V 23/004; F21V 23/0471
See application file for complete search history.

(56) References Cited

U.S. PATENT DOCUMENTS

| | | | | | |
|---|---|---|---|---|---|
| 1,933,173 | A | * | 10/1933 | Hunt | A47G 1/02 219/219 |
| 2,815,433 | A | * | 12/1957 | Zumwalt | A47G 1/02 219/219 |
| 3,839,620 | A | * | 10/1974 | Seibel | A47G 1/02 219/219 |
| 5,575,552 | A | * | 11/1996 | Faloon | B60Q 3/252 359/839 |
| 9,638,410 | B2 | * | 5/2017 | Yang | A45D 42/10 |
| 9,664,374 | B2 | * | 5/2017 | Kuroda | A47G 1/02 |
| 9,719,641 | B1 | * | 8/2017 | Volek | F21V 23/0471 |
| 10,039,853 | B1 | * | 8/2018 | Munn | A47G 1/02 |
| 10,076,176 | B2 | * | 9/2018 | Yang | A45D 42/10 |
| 10,473,887 | B2 | * | 11/2019 | Beyda | A45D 42/08 |
| 10,687,403 | B2 | * | 6/2020 | De Bruijn | A45D 42/10 |
| 10,869,537 | B2 | * | 12/2020 | Yang | A45D 42/10 |
| 11,640,042 | B2 | * | 5/2023 | Yang | A45D 42/10 132/316 |

* cited by examiner

*Primary Examiner* — Ismael Negron (57) ABSTRACT

A Heated Illuminated Bathroom Mirror with Sensing Modules, includes a mirror body, a fixed supporting frame, a control module, a LED light strip module, a switch module, a defogging module and proximity sensors. The control module actuates the switch module to activate the defogging module defog the mirror body, or the LED light strip module to provide illumination to a user when insufficient light or dark condition is detected. The control module may also be operated by the user's gestures.

8 Claims, 9 Drawing Sheets

HEATED ILLUMINATED BATHROOM MIRROR WITH SENSING MODULES

FIELD OF THE INVENTION

The present utility application relates to the bathroom mirror technology, and more particularly, to a heated illuminated bathroom mirror with sensing modules.

BACKGROUND OF THE INVENTION

A mirror is an object with a smooth surface and the ability to reflect light. Initially, the ancients used polished bronze as a mirror. There are two types of mirrors: flat mirrors and curved mirrors. The flat mirrors are often used by people to organize their appearance. The curved mirrors are divided into concave mirrors and convex mirrors. They are mainly used as dressing mirrors, furniture accessories, architectural decoration pieces, optical instrument components, solar cookers reflectors for car lights and searchlights, reflecting telescopes, car rear view mirrors and so on.

However, as the technology improves, requirements for smart home bathroom mirrors are getting higher and higher. For example, the existing US patent publication number U.S. Ser. No. 11/543,118B1 discloses an illuminating mirror comprising a shell, a mirror, a light source and a reflecting element. The shell is fixed on the back surface of the mirror and comprises a first surface and a second surface. A gap is provided between the first surface and the second surface. The light source is coupled to the baseboard and positioned behind the back surface of the mirror. The reflecting element is fixed on the back surface of the mirror and positioned adjacent the translucent portion of the mirror, wherein the baseboard is fixed in the gap of the shell, both first and second surfaces of the shell being orthogonal to the back surface of the mirror. The above-mentioned mirror could supply the light source for users looking in the mirror when the light is uneven or the light is dark. However, the above-mentioned lighting mirror still has some shortcomings, for example, when the mirror is installed in a bathroom, the mirror becomes foggy and blurred, which affects the use and requires the user to wait for a long time before normal use. Therefore, it needs to be improved.

DETAILED DESCRIPTION

The present utility application aims to provides a heated illuminated bathroom mirror with sensing modules that can overcome the shortcoming and deficiencies of existing technology, which is capable of supplying light source when in insufficient light or dark condition, meantime operating the defogging by the defogging module when the mirror body is foggy, which improves the display effect of the mirror.

In order to serve the above purposes, the technical scheme adopted by the present utility application is: a heated illuminated bathroom mirror with sensing modules, comprises a mirror body, a fixed supporting frame, a control module, a LED light strip module and a switch module. The mirror body comprises a baseboard, which assembled with a reflecting area and a light transmission area; the fixed supporting frame is fixed with the the baseboard; the LED light strip module is fixed on the light transmission area of the back surface of the baseboard; the switch module, the LED light strip module are both electrically connected with the control module. The heated illuminated bathroom mirror with sensing modules also comprises a defogging module and proximity sensors; the defogging module is fixed on the back surface of the baseboard; the proximity sensors and the defogging module are both electrically connect with the control module. The control module actuates the switch module to activate the defogging module defog the mirror body, or the LED light strip module to provide illumination to a user when insufficient light or dark condition is detected. The control module may also be operated by the user's gestures.

The defogging module comprises a heating piece; the heating piece is fixed on the back surface of the baseboard and located in the fixed supporting frame; the heating piece is electrically connected with the control module.

The back surface of the baseboard is covered with an explosion-proof film, located between the baseboard and the heating piece.

The fixed supporting frame is fixed on the back surface of the baseboard; a first mounting groove is arranged on the front surface of the fixed supporting frame and located in the light transmission area; the LED light strip module comprises a first LED light strip module arranged in the first mounting groove.

A second mounting groove arranged on the outside wall of the fixed supporting frame; the LED light strip module also comprises a second LED light strip module and a light transmission cover; the second LED light strip module is arranged in the second mounting groove and the light transmission cover is arranged on the second mounting groove.

The switch module is a touch switch or a push switch; the proximity sensor is an infrared gesture recognition sensor or a radar gesture sensor.

The control module, the proximity sensor and the switch module are all fixed on the back surface of the baseboard and located in the fixed supporting frame.

The first mounting groove and the second mounting groove are located between the front surface and the back surface of the fixed supporting frame; a locking groove is arranged between the back surface of the fixed supporting frame and the fist mounting groove.

The cross-section of the first mounting groove is rectangular or trapezoidal; the cross-section of the second mounting groove is trapezoidal.

After adopting the above technical scheme, the beneficial effect of the present utility application is: a heated illuminated bathroom mirror with sensing modules, a mirror body, a fixed supporting frame, a control module, a LED light strip module, a switch module, a defogging module and proximity sensors. The mirror body comprises a baseboard, which assembled with a reflecting area and a light transmission area; the fixed supporting frame is fixed with the baseboard and used to install the mirror body on the eternal assembles such as wall. The LED light strip module is fixed on the fixed supporting frame and located on the light transmission area of the back surface of the baseboard; the defogging module is fixed on the back surface of the baseboard; the LED light strip module, the switch module, the proximity sensors and the defogging module all are electrically connected with the control module; the control module is assembled with the switch condition of the defogging module controlled by the signal transmitted by the switch module or the work condition of the LED light strip module controlled by the detection signal transmitted by the proximity sensors. The LED light strip module comprises a first LED light strip module and a second LED light strip module. Supplying the light source for users when in insufficient light or dark condition is achieved by adopting the proximity sensors. If users need, they could control the LED light strip module quickly by the the gesture control even though they are washing up or with wet hands, and control the work condition of the LED light strip module without touching the switch module, such as switch function, lighting regulatory function or light strip switch function, which is easy to use. Meantime, it could operate defogging to improve the display effect of the mirror by the defogging module when the mirror body is foggy.

DESCRIPTION OF THE DRAWINGS

In order to provide a clearer description of the embodiment regarding the present utility application or the technical scheme in the prior art, below is a brief introduction to the drawings required in the embodiment or prior art description. Obviously, the drawings in the following description only relate to some embodiments of the present utility application. For ordinary technicians in this art, other drawings can be obtained based on these ones without providing any creative labor.

Explanation of reference symbols: 1. mirror body; 11. baseboard; 12. reflecting area; 13. light transmission area; 2. fixed supporting frame; 21. first mounting groove; 22. second mounting groove; 23. locking groove; 3. control module; 4. defogging module; 41. heating piece; 5. explosion-proof film; 6. LED light strip module; 61. first LED light strip module; 62. second LED light strip module; 63. light transmission cover; 7. switch module; 71. defogging switch; 72. lighting switch; 73. regulatory switch; 8. first proximity sensor; 9. power supply module; 81. detection window; 10. second proximity sensor; 14. mains box.

DETAILED DESCRIPTION OF THE PREFERRED EMBODIMENTS

Below is a further description of the present utility application based on the drawings.

This embodiment only shows an explanation of the present utility application and is not a limitation to the present utility application. Technicians in the art can make modifications to this embodiment as needed without making any creative contributions after reading this specification, which are always protected by the patent law as long as they are within the scope of the claims of the present utility application.

It should be noted that when an element is referred to as "being fixed" or "arranged" on another element, it can be directly or indirectly on the another element. When an element is referred to as "being connected" to another element, it can be directly or indirectly connected to the another element.

It should be understood that the terms "length" "width" "upper" "lower" "front" "back" "left" "right" "vertical" "horizontal" "top" "bottom" "inner" "outer", etc., are based on the orientations or positional relationships shown in the drawings. They are only for the convenience of describing the present application and simplifying the description, rather than indicating or implying the device referred to or element must have a specific orientation and orientation to be constructed and operated. Therefore, they are not to be considered to be limitations on the application.

Moreover, the terms "first" "second" are only for describing aims, rather than indicating or implying relative importance or implicitly specify the number of indicated technical characteristics. Therefore, features defined as "first" and "second" explicitly or implicitly include one or more of these features. In the description of some patents, "several" means two or more, unless otherwise specific limitations.

As FIGS. 1-2 and 4-9 shown, a heated illuminated bathroom mirror with sensing modules, comprises a mirror body 1, a fixed supporting frame 2, a control module 3, a defogging module 4, a LED light strip module 6, a switch module 7 and a first proximity sensor 8.

The mirror body 1 comprises a baseboard 11 assembled with a reflecting area 12 and a light transmission area 13; the fixed supporting frame 2 is fixed with the baseboard 11; the fixed supporting frame 2 is used to install the mirror body 1 on the eternal assembles such as walls. The LED light strip module 6 is fixed on the fixed supporting frame 2 and located on the light transmission area 13 of the back surface of the baseboard 11; the defogging module 4 is fixed on the back surface of the baseboard 11; the LED light strip module 6, the switch module 7, the first proximity sensor 8 and the defogging module 4 is electronically connected with the control module 3. The control module 3 actuates the switch module 7 to activate the defogging module 4 defog the mirror body 1, or the LED light strip module 6 to provide illumination to a user when insufficient light or dark condition is detected. The control module 3 may also be operated by the user's gestures.

Figure 1:
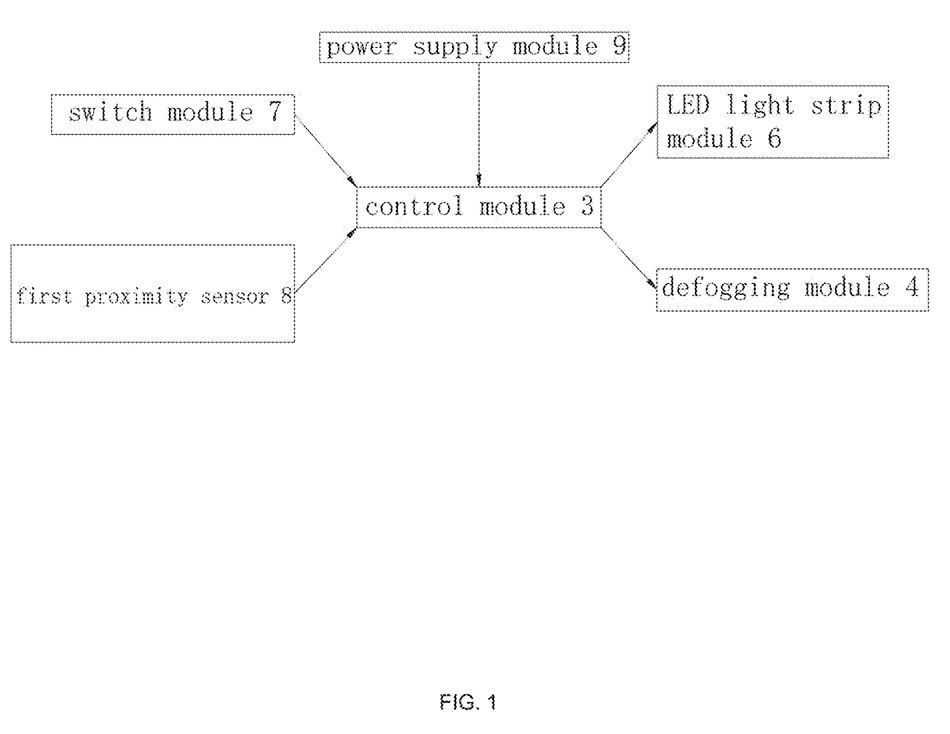
FIG. 1 is a structure diagram of the present application.
Figure 2:
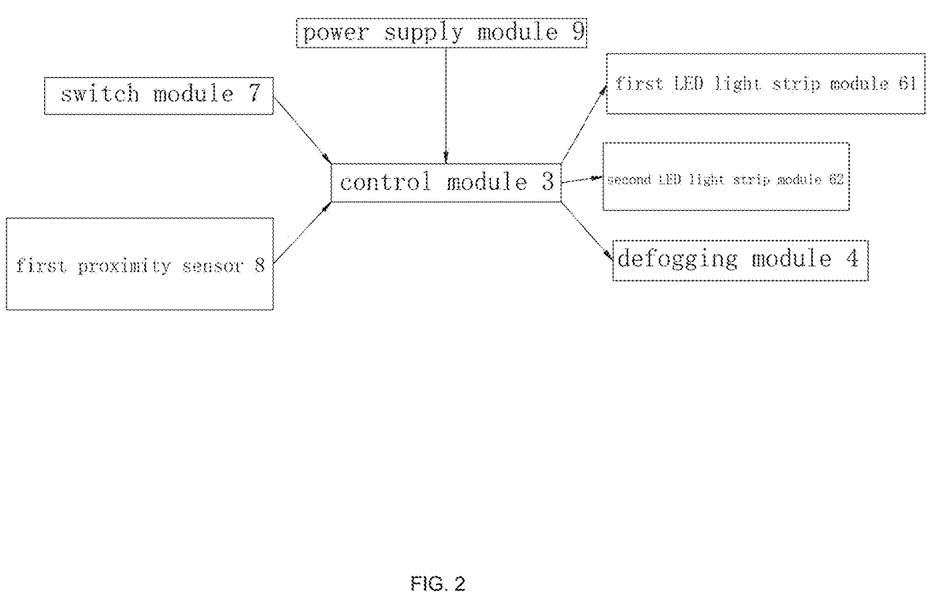
FIG. 2 is another structure diagram of the present application.
Figure 3:
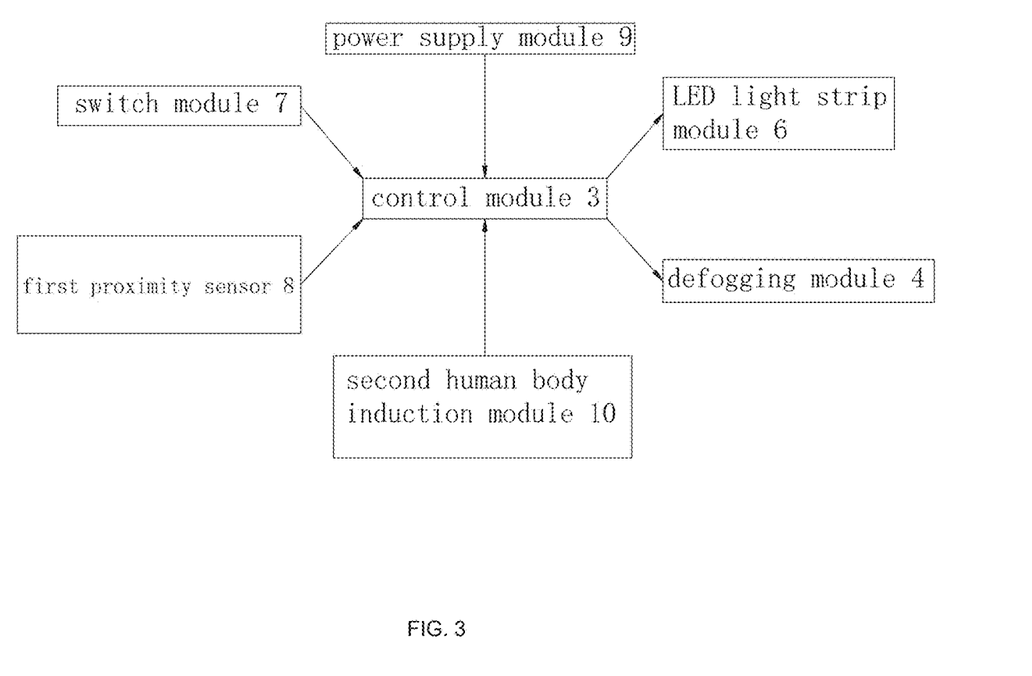
FIG. 3 is a structure diagram of the present application in another scheme.
Figure 4:
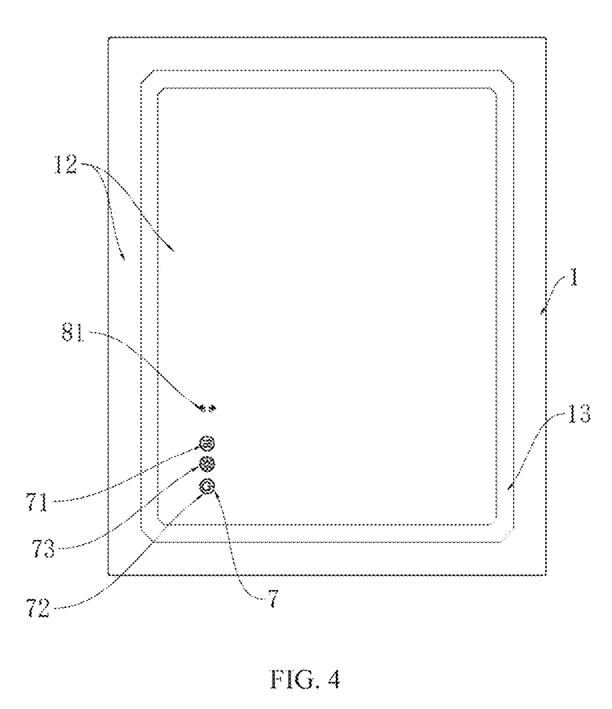
FIG. 4 is a structure schematic of the present application.

Optionally, the switch module 7 is assembled with a touch switch group or a push switch group; the proximity sensor 8 is an infrared gesture recognition sensor or a radar gesture sensor. In this embodiment, as FIG. 1-3 shows, the heated illuminated bathroom mirror with sensing modules also comprises a power supply module 9 used to supply power for the heated illuminated bathroom mirror with sensing modules. The control module 3 is electrically connected with the power supply module 9; and the power supply module 9 comprises power plugs and cables.

It should be noted that the first proximity sensor 8 is used to detect the gesture action signal; the switch module 7 is used to detect the switch signal; the control module 3 is used to control the switch condition of the defogging module 4 or the work condition of the LED light strip module 6 according to the switch signal transmitted by the switch module 7; the control module 3 is also used to control the work condition of the LED light strip module 6 by the user's gesture. If users need, they could control the LED light strip module 6 quickly by their gestures controlling the first proximity sensor 8.

Optionally, as FIG. 4-9 show, the LED light strip module 6 is arranged in the fixed supporting frame 2. In some embodiments, the fixed supporting frame 2 is fixed on the back surface of the baseboard 11; a first mounting groove 21 is arranged on the front surface of the fixed supporting frame 2 and located in the light transmission area 13; the LED light strip module 6 comprises a first LED light strip module 61, which is arranged in the first mounting groove 21 to function as lighting or filling light. Moreover, the first LED light strip module 61 is pasted and fixed on the side wall of the first mounting groove 21; the light transmission shell is made of translucent but opaque material. In some embodiments, the first mounting groove a comprises a light transmission cover 63, covering the first LED light strip module 61 to soften the light emitted by the mirror and maintain the beauty of the mirror.

Figure 6:
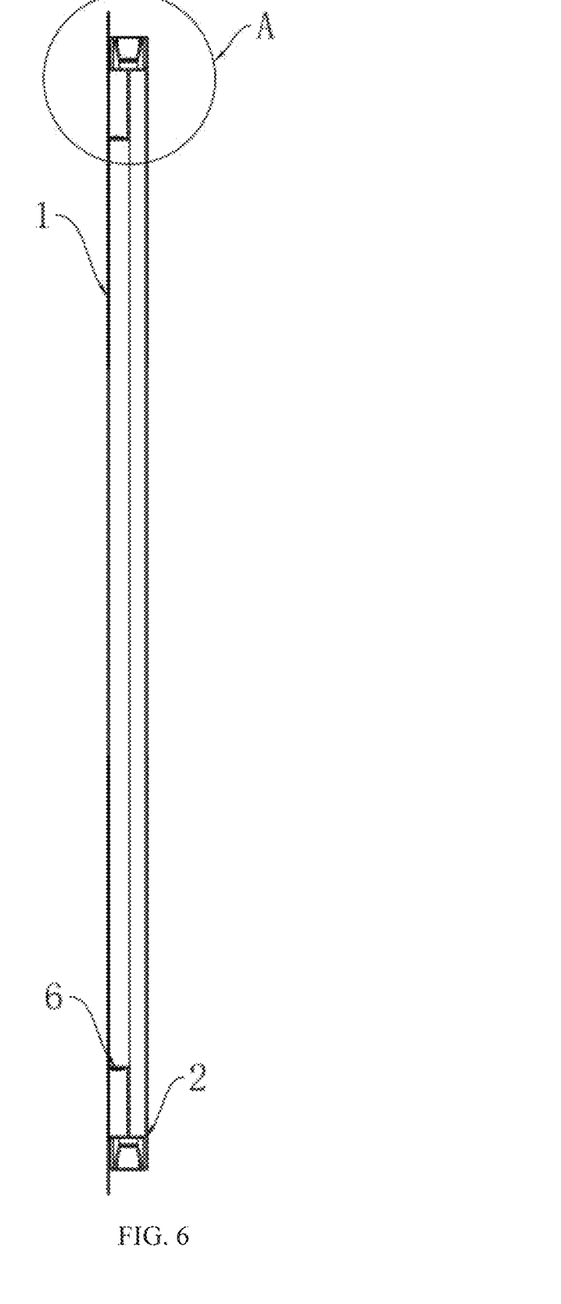
FIG. 6 is a sectional view of the present application.
Figure 7:
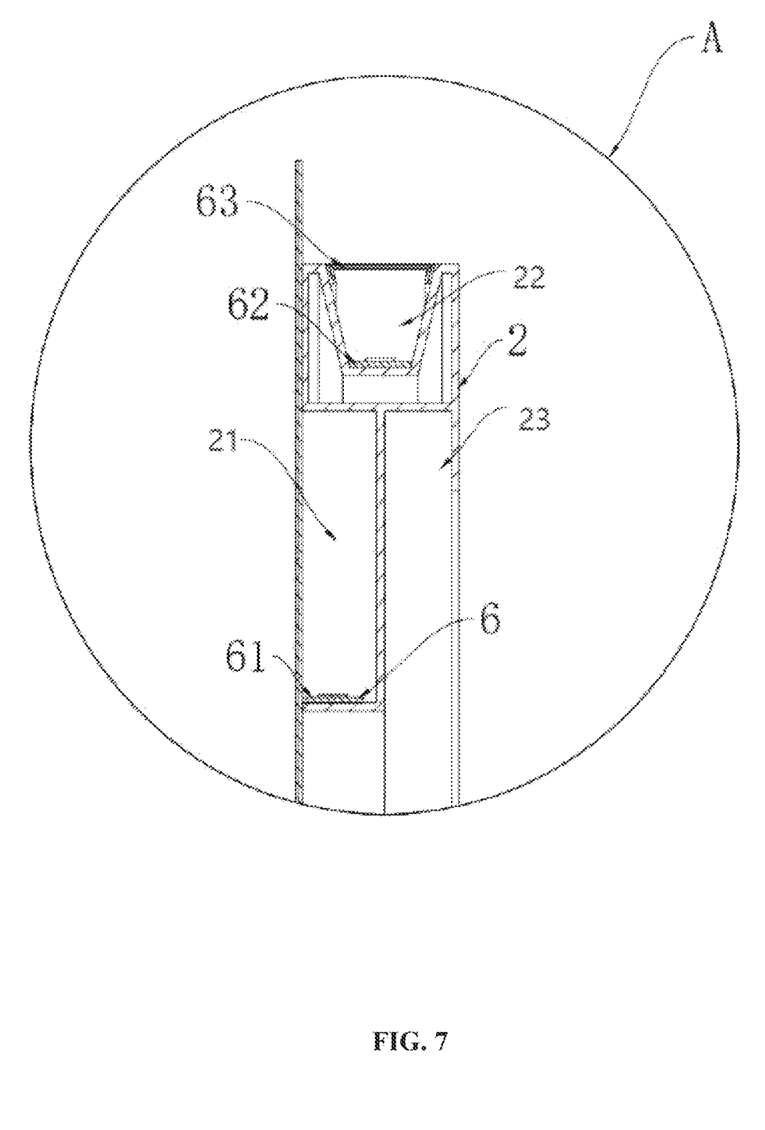
FIG. 7 is a partial enlargement diagram of A in FIG. 6.

Optionally, as FIGS. 6 and 7 show, a second mounting groove 22 is arranged on the outside wall of the fixed supporting frame 2; the LED light strip module 6 also comprises a second LED light strip module 62 and a light transmission cover 63; the second LED light strip module 62 is arranged in the second mounting groove 22; the light transmission cover 63 is arranged on the second mounting groove 22; the above are set to make the LED light strip module 6 emit outside by the light transmission area 13 or the outside wall of the LED light strip module 6 to increase the illumination area of the mirror. In this embodiment, the switch module 7 is a touch switch. Optional switch module 7 comprises: a defogging switch 71, a lighting switch 72 and a regulatory switch 73. The defogging switch 71 is used to turn on or off the defogging module 4; the lighting switch 72 is used to turn on or off the first LED light strip module 61 and/or the second LED light strip module 62; the regulatory switch 73 is used to regulate the luminance of the LED light strip module 6. In this embodiment, the LED light strip module 6 comprises: cold light lamp beads, warm light lamp beads and a baseboard. Several cold light lamp beads and warm light lamp beads are spaced one by one on the baseboard at intervals. The light transmission area 13 is rectangle, whose four corners are chamfered. In other embodiments, the LED light strip module 6 comprises several monochrome LED lamp beads and baseboards; several monochrome LED lamp beads stand side by side on the baseboards. The light transmission area 13 is rectangle,], ⊚, polygon or other irregular shape, such as cloud shape.

It should be noted that, as the LED light strip module 6 comprises the first LED light strip module 61 and the second LED light strip module 62, the control module 3 could switch the LED light strip module 6 according to the gesture action signal detected by the first proximity sensor 8 or the switch signal transmitted by the switch module. Adopting the first proximity sensor 8 realizes the goal of controlling the LED light strip module 6 quickly, and controlling the work condition of the LED light strip module 6 without touching the switch module, such as switch function, lighting regulatory function or light strip switch function.

Optionally, the control module 3 comprises a memory unit, which is used to memory and save automatically the color temperature (brightness) condition of the LED light strip module 6 after the set time such as eight seconds when the switch module 7 or the first proximity sensor 8 operates lastly and restores last memory condition after the LED light strip module 6 is powered next time, which is convenient for uses so that there is no need to regular the color temperature (brightness) of the LED light strip module 6 every time.

Optionally, as FIGS. 6 and 7 show, the cross-section of the first mounting groove 21 is rectangular or trapezoidal; and to increase the illumination area of the light mirror, the cross-section of the second mounting groove 22 is trapezoidal. The wide side of the second mounting groove 22 of the trapezoidal is an opening, and the opening of the second mounting groove 22 faces outward.

Optionally, as FIGS. 6 and 7 show, the first mounting groove 21 and the second mounting groove 22 locate between the front surface and the back surface of the fixed supporting frame 2; the locking groove 23 is arranged between the back surface of the fixed supporting frame 2 and the first mounting groove 21, the above are set for hanging easily the smart light on the eternal assembles such as wall. When installing, U-shaped or Z-shaped hang piece could be fixed on eternal assembles and hanging the smart light mirror on the hang piece to make the locking groove 23 plug into the hanging piece. The locking groove 23 is ring or open ring.

Figure 5:
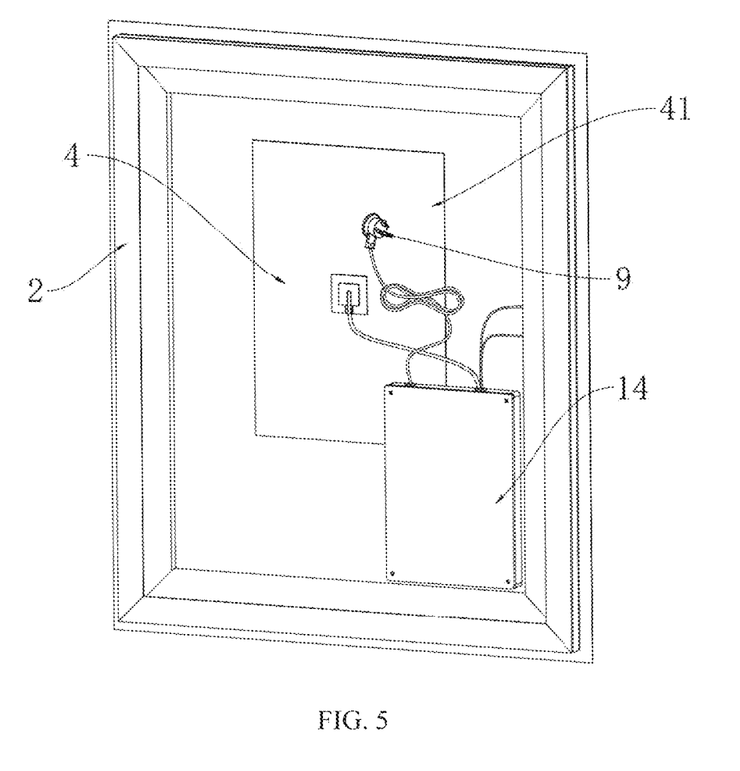
FIG. 5 is a structure schematic of the present application in another direction.
Figure 8:
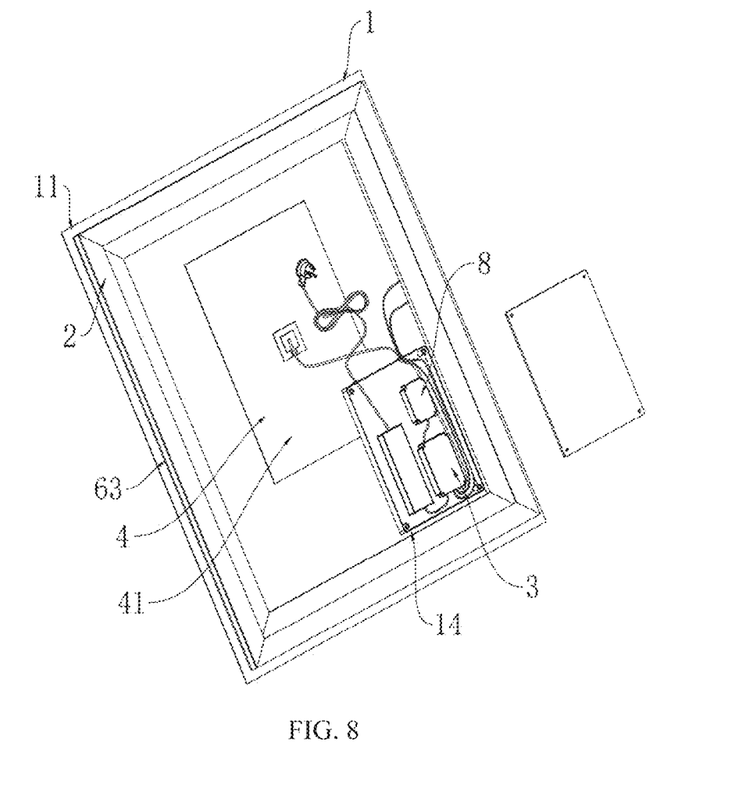
FIG. 8 is an explosion diagram of the present application.
Figure 9:
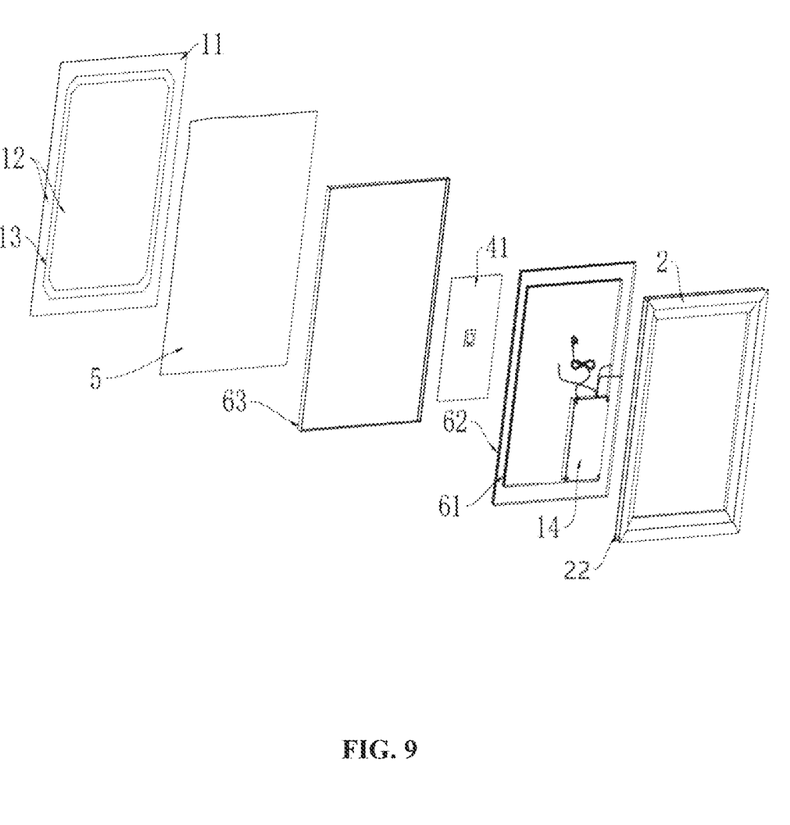
FIG. 9 is another explosion diagram of the present application.

Optionally, as FIGS. 5, 8 and 9 show, the defogging module 4 comprises a heating piece 41, which is fixed on the back surface of the baseboard 11 and located in the fixed supporting frame 2; the heating piece 41 is electrically connected with the control module 3 and is pasted and fixed on the back surface of the baseboard 11, which are arranged to realize the defogging function of the mirror body 1 by the defogging module 4. Optionally, the heating piece 41 is a flexible heating piece 41; the flexible heating piece 41 is pasted and fixed on the reflecting area 12 of the back surface of the baseboard 11.

Optionally, as FIG. 9 shows, the back surface of the baseboard 11 is covered with an explosion-proof film 5, and located between the baseboard 11 and the heating piece 41, to prevent debris flying from the mirror body 1 when it damages. The heating piece 41 is pasted and fixed with the explosion-proof film 5 directly.

Optionally, as FIGS. 4, 5, 8 and 9 show, the touch switch is arranged on the reflecting area 12 of the baseboard 11; the control module 3 is fixed on the back surface of the baseboard 11 and located in the space surrounded by the fixed supporting frame 2, the above facilitate the installation and the operation of the mirror. In this embodiment, the first proximity sensor 8 is arranged on the reflecting area 12 of the back surface of the baseboard 11; a detection window 81 is arranged on the reflecting area 12 of the baseboard 11 for the detection head installation of the first proximity sensor 8. Optionally, a mains box 14 is pasted on the back surface of the baseboard 11 and located in the space surrounded by the fixed supporting frame 2; the control module 3, the first proximity sensor 8, the power supply module 9 and the switch module 7 are all fixed in the mains box 14. Optionally, the control module 3, the first proximity sensor 8, the power supply module 9 and the switch module 7 could be pasted and fixed in the mains box 14. In some embodiments, the control module 3 and the switch module 7 are integrated set. In some embodiment, the control module 3, the switch module 7 and the first proximity sensor 8 are all integrated set together. In some embodiment, as FIG. 3 shows, the heated illuminated bathroom mirror with sensing modules also comprises a second proximity sensor 10, which is electrically connected with the control module 3; there is a clock unit integrated in the control module 3. The second proximity sensor 10 is used to output induction shutdown signal when not detecting the human gestures within the default range; the clock module is used to start timer when the control module 3 receives the shutdown signal and output timing signal after the present time and to receive the timing signal and control the power off of the heated illuminated bathroom mirror with sensing modules. Setting the clock module to timing in the bathroom light mirror, the control module 3 cloud control the LED light strip module 6 or the defogging module 4 shutdown automatically when the second proximity sensor 10 does not induct the human gestures, which achieves the goal of preventing power wasting from users forgetting to turn off the light or the defogging module 4. In this embodiment, the second proximity sensor 10 is a radar sensor or an infrared sensor.

In some embodiments, the LED light strip module 6 comprises a light transmission shell and a flexible light strip module; a mounting cavity is arranged in the axis of the light transmission shell; the light transmission shell is covered on the light transmission area 13 and fixed with the fixed supporting frame 2; the front surface of the light transmission shell is pasted and fixed with the light transmission area 13 of the baseboard 11; the flexible light strip module is fixed in the mounting cavity. Moreover, the fixed supporting frame 2 comprises a first frame and a second frame; the first frame is fixed on the reflecting area 12; the front surface of the light transmission shell and the baseboard 11 are covered on the light transmission 13; the back surface of the light transmission shell is fixed with the second frame. Moreover, the fixed supporting frame 2 also comprises a connecting plate, whose two ends are integrated set with the first frame and the second frame separately; the first frame parallels to the second frame; an accommodation slot is arranged in the space surrounded by the second frame, the connecting plate and the light transmission area 13, which is used for the installation of the LED light strip module 6. In this embodiment, the connecting plate perpendiculars to the first frame and the second frame separately. The front surface of the LED light strip module 6 is pasted and fixed with the light transmission area 13 of the baseboard 11; one side wall of the LED light strip module 6 is pasted and fixed with the connecting plate. Optionally, the cross-section of the fixed supporting frame 2 is in Z shape or rectangle or "=" shape.

In some embodiment, the fixed supporting frame 2 is fixed with the edge of the baseboard 11 and extends from the edge toward the back surface of the baseboard 11; the LED light strip module 6 is fixedly arranged in the fixed supporting frame 2; the outside wall of the fixed supporting frame 2 comprises an opening slot for the LED light strip module 6 to emit light.

Optionally, to satisfy users who like to listen to audio when washing and prevent reducing the service life of mobile phones from water mist entering the mobile phones when taking them in the bathroom, the heated illuminated bathroom mirror with sensing modules also comprises a speaker for outputting sound; the switch module 7 comprises: a defogging switch 71, a lighting switch 72 and a bluetooth switch; the defogging switch 71 is used to turn on or off the defogging module 4; the lighting switch 72 is used to turn on or off the LED light strip module 6 or regulate the color temperature (brightness) of the LED light strip module 6; the bluetooth switch is used to turn on or off the wireless connection between the speaker and the mobile phones. The music playing function of the heated illuminated bathroom mirror with sensing modules is achieved by the wireless connection between the bluetooth switch and the speaker.

All above is only an explanation of the present application, instead of a limitation. Those technicians in the art make other modifications or equivalent replacement to this embodiment, as long as they do not deviate from the spirit and scope of the technical solutions of the present application, all should be covered by the claims of the present application.

The invention claimed is:

1. A bathroom mirror, comprising:
   a mirror body including a baseboard having a light transmitting area and a reflecting area;
   a fixed supporting frame fixed to a back surface of the baseboard;
   a first mounting groove arranged on a front surface of the fixed supporting frame to corresponds to the light transmission area;
   a control module;
   a first LED light strip module positioned on the back surface of the baseboard proximate the light transmitting area, and arranged in the first mounting groove;
   a switch module electrically coupled with the control module and the first LED light strip module;
   a defogging module electrically coupled with the control module, and positioned on the back surface of the baseboard; and
   a first proximity sensor electrically coupled with the control module, and configured for detecting a user,
   wherein the control module is configured to at least one of activate the defogging module in response to a signal transmitted by the switch module, or the activate the first LED light strip module in response to a signal transmitted by the first proximity sensor.

2. The bathroom mirror according to claim 1, wherein the switch module is at least one of a touch switch or a push switch, and the first proximity sensor is at least one of an infrared sensor or a radar sensor.

3. The bathroom mirror according to claim 1, wherein the control module, the first proximity sensor, and the switch module are all fixed on the back surface of the baseboard and located in the fixed supporting frame.

4. The bathroom mirror according to claim 1, the defogging module comprises a heating piece fixed on the back surface of the baseboard and located in the fixed supporting frame, wherein the heating piece is electrically connected with the control module.

5. The bathroom mirror according to claim 4, further comprising an explosion-proof film disposed on the baseboard between the baseboard and the heating piece.

6. The bathroom mirror according to claim 1, further comprising:
   a second mounting groove arranged on an outside wall of the fixed supporting frame;
   a light transmission cover arranged in the second mounting groove; and
   a second LED strip module arranged in the second mounting groove to project light through the light transmission cover.

7. The bathroom mirror according to claim 6, further comprising a locking groove, wherein the first mounting groove and the second mounting groove are located between the front surface and the back surface of the fixed supporting frame, and the locking groove is arranged between the back surface of the fixed frame and the first mounting groove.

8. The bathroom mirror according to claim 6, wherein the cross-section of the first mounting groove is rectangular or trapezoidal, and the cross-section of the second mounting groove is trapezoidal.

* * * * *